W. R. SORGEL.
VIBRATOR.
APPLICATION FILED JAN. 18, 1915.
1,184,664.
Patented May 23, 1916.
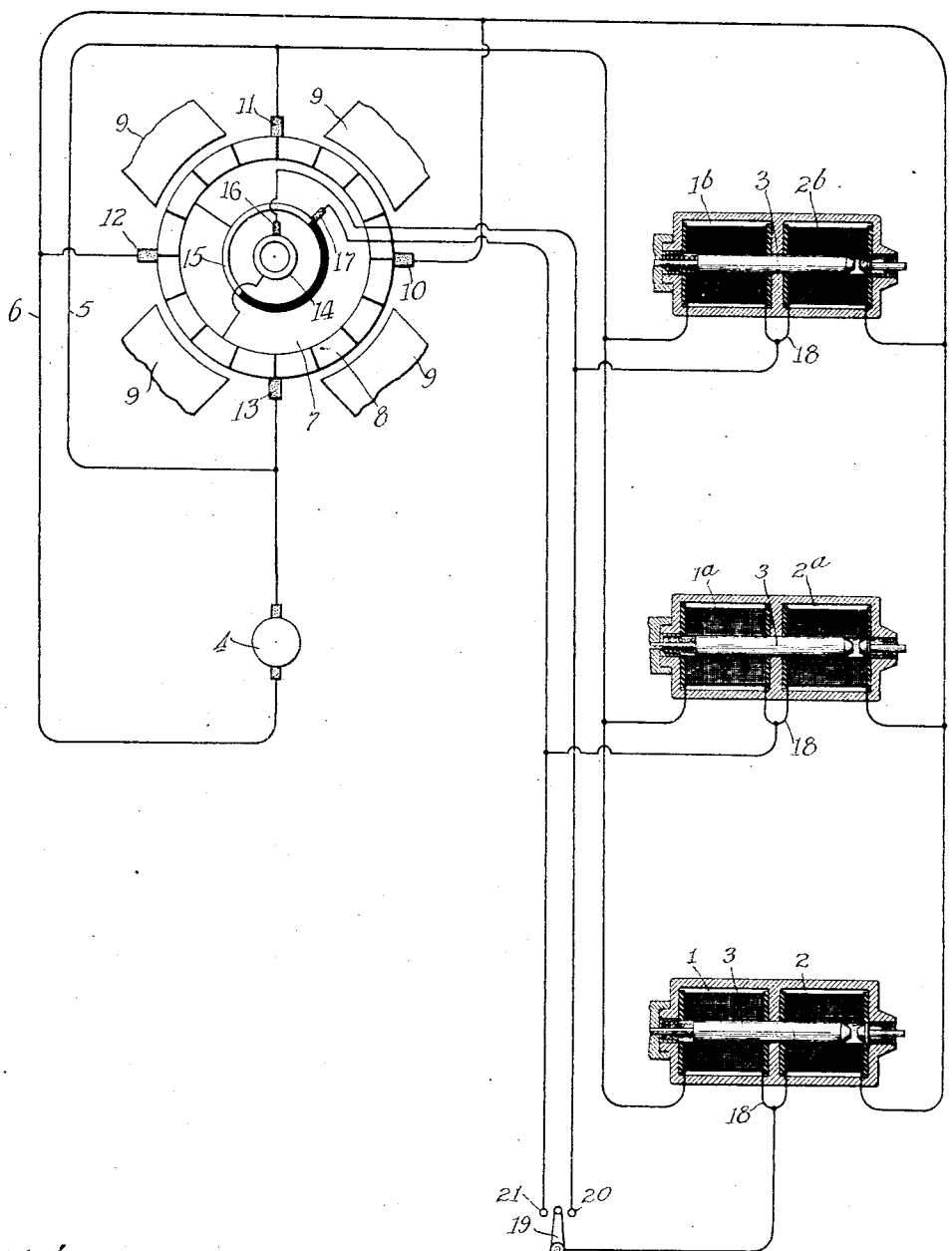

UNITED STATES PATENT OFFICE.

WILLIAM R. SORGEL, OF MILWAUKEE, WISCONSIN, ASSIGNOR TO INTERNATIONAL ELECTRIC TOOL CO., OF MILWAUKEE, WISCONSIN.

VIBRATOR.

1,184,664. Specification of Letters Patent. Patented May 23, 1916.

Application filed January 18, 1915. Serial No. 2,903.

*To all whom it may concern:*

Be it known that I, WILLIAM R. SORGEL, a citizen of the United States, residing at Milwaukee, in the county of Milwaukee and State of Wisconsin, have invented a certain new and useful Improvement in Vibrators, of which the following is a full, clear, concise, and exact description, reference being had to the accompanying drawings, forming a part of this specification.

My invention relates to vibrators or hammers and has for its object the provision of an electric vibrator of this kind in which no vibratory contacts are employed. More particularly my vibrator is used with uni-directional current and is in part an improvement over my co-pending application Serial No. 807,412, filed December 18, 1913.

In general my invention contemplates one form herein of a vibrator or similar device in which an armature or plunger is moved to and fro through the action of preferably two coils, which vibrator receives its current from a uni-directional source, all of the above being used in connection with a dynamo electric machine which periodically causes a deënergization of one or the other coil.

My invention contemplates herein the production of means to change the number of blows or oscillations to be made by the armature or plunger. I will describe this particular form which my invention may take more in detail by referring to the accompanying drawing illustrating the same diagrammatically.

In the illustration I show a vibrator comprising two coils 1 and 2 adapted to control a plunger 3. The coils 1 and 2 are to be alternatively energized, thus to shift the vibrator 3 back and forth. A source of current 4 is employed providing uni-directional current which has its conductors 5 and 6 connected respectively to one of each of the terminals of the coils 1 and 2. A dynamo electric machine 7 is diagrammatically illustrated by its commutator 8 and its four pole pieces 9. Four brushes 10, 11, 12 and 13 are also shown, opposite brushes being connected together and connected respectively to the conductors 5 and 6 from the source of supply. The current from the source of supply is thus adapted to rotate the armature of the dynamo electric machine. Two collector rings respectively 14 and 15 are also provided, the collector ring 14 being metallically continuous throughout 360°, and the collector ring 15 being metallically continuous only throughout 180° as shown, the remaining 180° being of insulating material. Brushes 16 and 17 coöperate respectively with these collector rings. The collector rings 14 and 15 are respectively connected to commutator segments apart the distance between two pole pieces. The central connections of the coils 1 and 2 are connected together by means of conductor 18 and lead to a switch 19. The switch 19 coöperates with two contact points 20 and 21 connected respectively to the brushes 16 and 17. It will thus be seen that the two coils 1 and 2 are connected directly in bridge of the conductors 5 and 6.

Now if the switch 19 were placed in contact with the contact segment 20, then the collector ring 14 would be connected to the conductor 18 which joins the central terminals of the coils 1 and 2. It will thus be seen that periodically the collector ring 14 by virtue of its connection with a commutator segment short circuits one or the other of the coils 1 and 2. Under this condition of things the coils are alternatively energized and the plunger 3 moves back and forth. Instead of having the collector ring 14 connected directly to a commutator segment it may be connected to the far end of the armature conductor connected to that commutator segment as shown in my said co-pending application.

Now in order to reduce the number of blows per second transmitted by the plunger 3, the switch 19 is thrown from the contact post 20 to the contact post 21. In this situation the collector ring 15 is connected to the conductor 18. It will be seen that similar conditions obtain so far as the energization of coils 1 and 2 are concerned during one-half of the rotation of said commutator 15, whereas during the other half no change is effected in the connections of the coils 1 and 2 and the plunger does not operate. Thus the plunger makes just one-half the number of oscillations in this case as in the first.

It might be pointed out that the brush 17 is so placed as to break the circuit at its insulating section during the point of no current so that no sparking need occur, it being assumed of course that the collector ring 15 is so shifted that the dividing line between its metallic and insulating sections comes under the brush 17 at the proper time.

I also show a vibrator having the coils 1ª, and 2ª, which as will be seen is connected permanently in such a manner as to be operative by the commutator 15, and I show a further vibrator having the coils 1ᵇ and 2ᵇ as connected to operate from the commutator 14. This indicates that both styles of vibrators may be used at the same time, only one vibrator making a certain number of reciprocations, and the other vibrator making a different number of vibrations. In fact, the number of vibrators operated from either of the circuits doesn't change the effect.

From what has been described the nature of my invention will be clear to those skilled in the art as will also the fact that the illustration herein shown is illustrative merely of one form which my invention may take.

Having however thus described one embodiment of my invention, what I claim as new and desire to secure by Letters Patent is:

1. A system of the character described including a pair of coils, and means for rapidly and alternately energizing and deënergizing said coils, said means including a source of current from which said coils receive their current, potential controlling means operated from said source, and an electrical connection between one terminal of each of said coils and said potential controlling means to thereby control the potential of the said terminals of said coils from said potential controlling means, said potential controlling means including a segmental collector ring to control the number of current changes.

2. A system of the character described including a pair of coils, and means for rapidly and alternately energizing and deënergizing said coils, said mean including a source of current from which said coils receive their current, potential varying means operated from said source, and an electrical connection between one terminal of each of said coils and said potential varying means to thereby control the potential of the said terminals of said coils from said potential varying means, said potential varying means including a dynamo electric machine, that portion of whose electrical conducting portions which is associated with said coils serving merely as a conducting circuit for the current from said coils in addition to its potential varying function, said potential varying means including a segmental collector ring to control the number of current changes.

3. A system of the character described including a pair of coils, and means for rapidly and alternately energizing and deënergizing said coils, said means including a source of current from which said coils receive their current, potential controlling means operated from said source, and an electrical connection between one terminal of each of said coils and said potential controlling means to thereby control the potential of the said terminals of said coils from said potential controlling means, said potential controlling means including a dynamo electric machine, that portion of whose electrical conducting portions which is associated with said coils serving merely as a conducting circuit for the current from said coils in addition to its potential controlling function, said potential controlling means including a segmental collector ring to control the number of current changes.

4. A system of the character described including a pair of coils, and means for rapidly and alternately energizing and deënergizing said coils, said means including a source of current from which said coils receive their current directly, potential varying means operated from said source, and an electrical connection between one terminal of each of said coils and said potential varying means to thereby control the potential of the said terminals of said coils from said potential varying means, said potential varying means including a dynamo-electric machine of which that part of its electrical conducting portions which is connected with said coils serves only as a return circuit for the current from said coils in addition to its potential varying function, said potential varying means including a segmental collector ring to control the number of current changes.

5. A system of the character described including a coil, and means for rapidly energizing and deënergizing said coil, said means including a source of current together with a collector ring for periodically short circuiting said coil without disturbing the connection of said coil with said source of current, and a further segmental collector ring for reducing the number of current changes, and means for associating said coil with one or the other of said collector rings.

6. A system of the character described including a pair of coils, and means for rapidly energizing and deënergizing said coils, said means including a source of current together with a collector ring for periodically short circuiting said coils without disturbing the connection of said coils with said source of current, and a further segmental collector ring for reducing the number of current changes, and means for associating said coils with one or the other of said collector rings.

7. A system of the character described comprising a pair of coils, a source of current, and a dynamo-electric machine for controlling the alternate energization and deenergization of said coils, a collector ring for said dynamo electric machine, a second segmental collector ring therefor, and means for associating said pair of coils with either of said collector rings.

In witness whereof, I hereunto subscribe my name this 19th day of October, A. D., 1914.

WILLIAM R. SORGEL.

Witnesses:
PETER NEUMANN,
WILLIAM HERMAN GAULKE.